US 9,207,742 B2
Dec. 8, 2015

(12) United States Patent
Lin

(10) Patent No.: US 9,207,742 B2
(45) Date of Patent: Dec. 8, 2015

(54) POWER SAVING OPERATING METHOD FOR AN ELECTRONIC DEVICE BY DISABLING A CONNECTION PORT TO A TOUCH DEVICE BEFORE THE TOUCH DEVICE ENTERS POWER-SAVING MODE

(71) Applicant: Wistron Corporation, New Taipei (TW)

(72) Inventor: Margaret Peyi Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 300 days.

(21) Appl. No.: 13/896,346

(22) Filed: May 17, 2013

(65) Prior Publication Data

US 2014/0215247 A1    Jul. 31, 2014

(30) Foreign Application Priority Data

Jan. 25, 2013  (TW) .............................. 102102992 A

(51) Int. Cl.
G06F 1/32 (2006.01)
(52) U.S. Cl.
CPC ............ *G06F 1/3228* (2013.01); *G06F 1/3278* (2013.01); *Y02B 60/126* (2013.01)
(58) Field of Classification Search
CPC .................................................... G06F 1/3203
USPC ..................................................... 713/2, 323
See application file for complete search history.

(56) References Cited

U.S. PATENT DOCUMENTS

| 8,743,083 B2 * | 6/2014 | Zanone et al. ................. 345/174 |
| 2006/0033722 A1 * | 2/2006 | Chiu et al. ..................... 345/173 |
| 2010/0214254 A1 | 8/2010 | Tsai |
| 2011/0012843 A1 * | 1/2011 | Li et al. ......................... 345/173 |
| 2011/0252259 A1 | 10/2011 | Choi et al. |
| 2014/0327623 A1 * | 11/2014 | Yu et al. ......................... 345/173 |

FOREIGN PATENT DOCUMENTS

| TW | 201032115 | 9/2010 |
| TW | 201107960 | 3/2011 |
| WO | 2009076974 | 6/2009 |
| WO | 2011094323 | 8/2011 |
| WO | 2012019153 | 2/2012 |

OTHER PUBLICATIONS

"Office Action of Taiwan Counterpart Application", issued on Oct. 2, 2014, p. 1-p. 9, with English translation.

\* cited by examiner

*Primary Examiner* — Suresh Suryawanshi
(74) *Attorney, Agent, or Firm* — Jianq Chyun IP Office

(57) ABSTRACT

A power-saving operating method for an electronic device is provided. A control chip of the electronic device has an interrupt pin, and the electronic device couples to a touch device through a connection port and the interrupt pin. When the touch device is idle for over an idle time, a BIOS is informed through the interrupt pin to disable the connection port. When a number of touch signals received from the touch device within a first predetermined time is not less than a first predetermined amount, the connection port is enabled. When the number of the touch signals received from the touch device within the first predetermined time is less than the first predetermined amount or none of the touch signal is received within the first predetermined time, a reading operation for reading the connection port is interrupted and the touch device enters a power-saving mode.

11 Claims, 4 Drawing Sheets

POWER SAVING OPERATING METHOD FOR AN ELECTRONIC DEVICE BY DISABLING A CONNECTION PORT TO A TOUCH DEVICE BEFORE THE TOUCH DEVICE ENTERS POWER-SAVING MODE

CROSS-REFERENCE TO RELATED APPLICATION

This application claims the priority benefit of Taiwan application serial no. 102102992, filed on Jan. 25, 2013. The entirety of the above-mentioned patent application is hereby incorporated by reference herein and made a part of this specification.

BACKGROUND OF THE INVENTION

1. Field of the Invention

The invention relates to an operating method and an electronic device, and more particularly to a power-saving operating method for a touch device and an electronic device using the same.

2. Description of Related Art

Power management is one of the most important topics for common desktop computers as well as portable peripheral equipments (such as notebook computer) which relies on power supplied by batteries. A crucial key for power management is to effectively reduce power usage of inactive equipments with respect to operating conditions of computer devices and peripheral equipments, so as to improve efficiency and extend lifetime of batteries.

Conventional computers generally adopt an advanced power management (APM) specification, such specification is an application programming interface developed by Microsoft and Intel for monitors, which can be used to store a power supply setting between personal computers and monitors having specific batteries. A major concern to the APM lies where it is mainly controlled by a firmware of a basic input/output System (BIOS), and power may not be effectively utilized with changes in operating processes. The APM may only guess current activities of a user based on interrupt request (IRQ) and input/output port, (I/O Port). Therefore, it is difficult to meet all requirements in effectively saving power and extending lifetime of batteries.

In order to maintain a common power management interface between operating systems and hardware, an advanced configuration and power interface (ACPI) standard has been developed to improve efficiency of power management based on interactions between the user and the operating system by managing power in response to commands from an operating system instead of the BIOS. That is, once the operating system is informed of certain functions in the computer being inactive, the functions may be automatically terminated to reduce power consumption. The ACPI interface may providing a proper power and a host working frequency according information such as motherboard temperature, fan speed and voltage of the power supply detected by specific hardware, so as to effectively distribute and transmit power to system devices thereby achieving power-saving while maintaining working efficiency.

Under the power management of ACPI, most of devices not being operated under a working condition may enter a sleep state (D1 to D3 states) which is relatively with less power consumption, so as to reduce power consumption. However, in order to support a wake function, the devices merely reduce power consumption rather than turn off power entirely. A total power consumption to the devices in above-said condition may also be a burden that affects lifetime of the battery. Therefore, overall lifetime of the battery may be further extended by saving power consumption in the condition.

SUMMARY OF THE INVENTION

The invention is directed to a power-saving operating method and an electronic device, which can reduce power consumption of a touch device when the touch device is idle.

The invention provides a power-saving operating method for an electronic device having a processor, a control chip and a connection port. The control chip further includes an interrupt pin, the electronic device couples to a touch device through the connection port and the interrupt pin, and the control chip couples to the connection port. The method includes: informing a basic input/output system through the interrupt pin of the control chip by the touch device to disable the connection port when the touch device is idle for over an idle time, determining whether the processor receives at least one touch signal from the touch device within a first predetermined time, enabling the connection port when a number of the at least one touch signal from the touch device received by the processor within the first predetermined time is not less than a first predetermined amount, and interrupting a reading operation for reading the connection port and making the touch device enter a power-saving mode when the number of the at least touch signal from the touch device received by the processor within the first predetermined time is less than the first predetermined amount or none of the at least signal is received within the first predetermined time.

According to the power-saving operating method in an embodiment of the invention, the step of informing a basic input/output system through the interrupt pin of the control chip by the touch device to disable the connection port when the touch device is idle for over an idle time, further includes: transmitting an interrupt signal from the touch device to the processor through the interrupt pin of the control chip, and disabling the connection port by the BIOS according to the interrupt signal received by the processor.

According to the power-saving operating method in an embodiment of the invention, the processor executes an operating system, and the step of disabling the connection port by the BIOS includes: calling an advanced configuration and power interface source language of the basic input/output system by an advanced configuration and power interface driver of the operating system according to the interrupt signal received by the processor to make the basic input/output system disable the connection port.

According to the power-saving operating method in an embodiment of the invention, after the step of making the touch device enter the power-saving mode, the power-saving operating method further includes: receiving a wake-up signal, switching the touch device from the power-saving mode back to an normal operating mode according to the wake-up signal, informing the basic input/output system through the interrupt pin of the control chip by the touch device to enable the connection port, determining whether the processor receives the at least one touch signal from the touch device within a second predetermined time, disabling the connection port by the processor when the number of the at least one touch signal from the touch device received by the processor within the second predetermined time is less than a second predetermined amount or none of the at least one touch signal is received within the second predetermined time, and re-executing the reading operation on the connection port by the processor and writing a data input by the touch device by the processor when the number of the at least touch signal from the touch device received by the processor within the second predetermined time is not less than the second predetermined amount.

According to the power-saving operating method in an embodiment of the invention, the control chip includes a platform controller hub.

According to the power-saving operating method in an embodiment of the invention, the interrupt pin includes a general purpose I/O.

The invention provides an electronic device having a connection port, a control chip, a memory unit and a processor. The connection port is coupled to a touch device. The control chip has an interrupt pin, the electronic device couples to a touch device through the connection port and the interrupt pin, and the control chip couples to the connection port. The memory unit stores a basic input/out system (BIOS). The touch device transmits an interrupt signal to the processor through the interrupt pin of the control chip when the touch device is idle for over an idle time, and the processor executes the basic input/output system to disable the connection port according to the received interrupt signal. Whether at least one touch signal from the touch device is received within a first predetermined time is then determined. The BIOS is executed to enable the connection port when a number of the at least one touch signal from the touch device received within the first predetermined is not less than a first predetermined amount. A reading operation for reading the connection port is interrupted and the touch device enters a power-saving mode when the number of at least one touch signal from the touch device received within the first predetermined time is less than the first predetermined amount or none of the at least one signal is received within the first predetermined time.

According to the electronic device in an embodiment of the invention, the processor executing the basic input/output system to disable the connection port further includes: calling an advanced configuration and power interface source language of the basic input/output system by an advanced configuration and power interface driver of an operating system executed by the processor according to the interrupt signal received by the processor to make the basic input/output system disable the connection port.

According to the electronic device in an embodiment of the invention, after the touch device enters the power-saving mode, the electronic device further includes: the touch device is switched from the power-saving mode back to an normal operating mode according to the wake-up signal, a resuming signal is transmitted from the touch device to the processor through the interrupt pin of the control chip, and the BIOS is executed by the processor to enable the connection port according to the resuming signal, determining whether the at least one touch signal from the touch device is received within a second predetermined time by the processor, disabling the connection port by the processor when a number of the at least touch signal received from the touch device within the second predetermined time is less than a second predetermined amount or none of the at least one touch signal is received within the second predetermined time, and re-executing the reading operation on the connection port and writing a data input by the touch device by the processor when the number of the at least one touch signal received from the touch device within the second predetermined time is not less than the second predetermined amount.

According to the electronic device in an embodiment of the invention, the control chip includes a platform controller hub.

According to the electronic device in an embodiment of the invention, the interrupt pin includes a general purpose I/O.

Accordingly, the invention provides the interrupt pin on the control chip to be used as a bridge for transmitting control signals between the electronic device and the touch device. When the touch device is idle, the interrupt signal is transmitted to the processor through the interrupt pin, and with the operating system executed by the processor under the ACPI standard, the BIOS is triggered to disable the connection port between the touch device and the electronic device, so as to switch the power state of the touch device from the normal operating mode to the power-saving mode thereby reducing power consumption of the touch device.

To make the above features and advantages of the invention more comprehensible, several embodiments accompanied with drawings are described in detail as follows.

DESCRIPTION OF THE EMBODIMENTS

Figure 1:
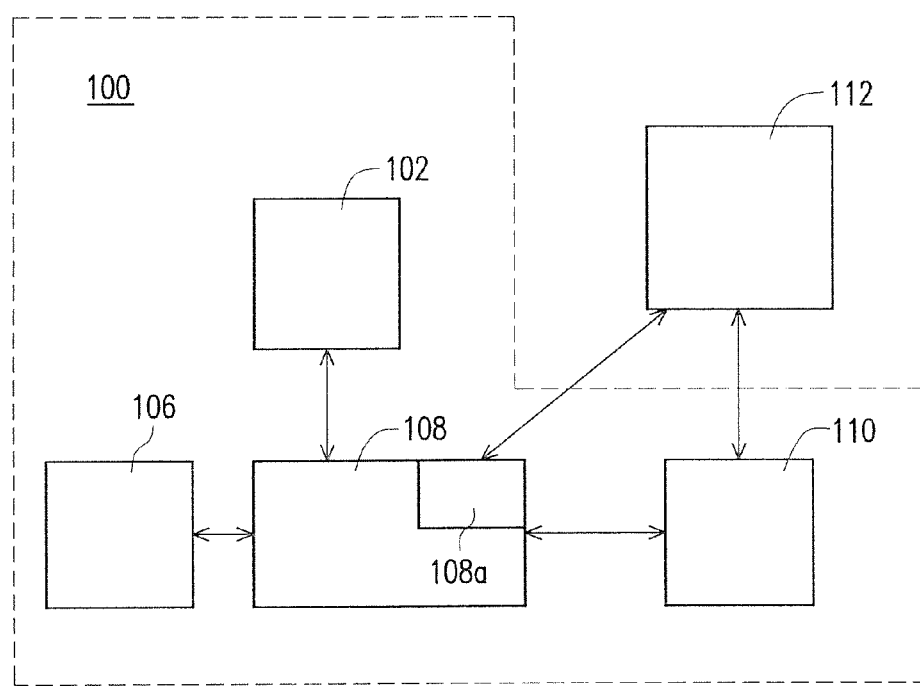
FIG. 1 illustrates an electronic device according to an embodiment of the invention.
Figure 2:
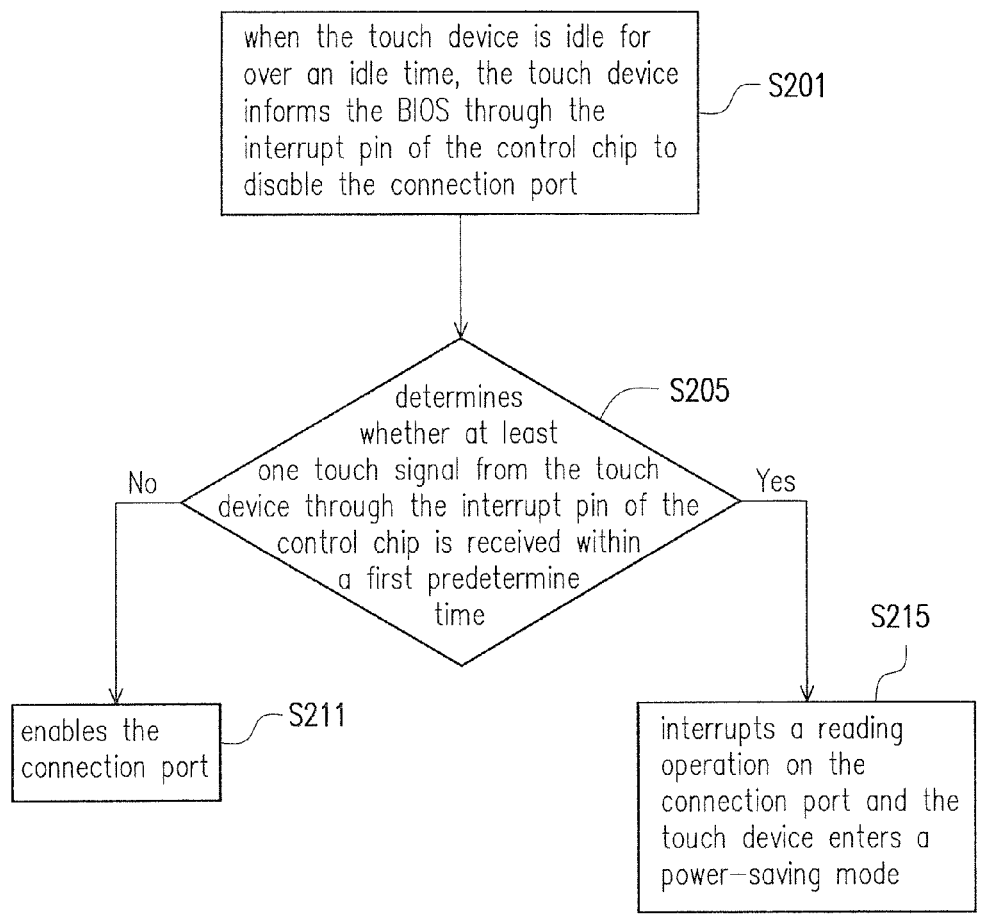
FIG. 2 is a process flowchart illustrating a power-saving operating method according to an embodiment of the invention.

FIG. 1 illustrates an electronic device according to an embodiment of the invention. FIG. 2 is a process flowchart illustrating a power-saving operating method according to an embodiment of the invention. Referring to FIG. 1, the power-saving operating method of the present embodiment is adapted for an electronic device 100, and the electronic device 100 includes a processor 10, a memory unit 106, a control chip 108 and a connection port 110. Among which, the control chip 108 further includes an interrupt pin 108a. The electronic device 100 couples to a touch device 112 respectively through the connection port 110 and the interrupt pin 108a, and the control chip 108 respectively couples to the connection port 110, the processor 102 and the memory unit 106.

Further, the processor 102 can be, for example, a central processing unit (CPU) for executing data of hardware, firmware and processing software in the electronic device 100. The control chip 108 can be, for example, a platform controller hub (PCH) and uses the interrupt pin 108a (such as a general purpose input/output (general purpose I/O, GPIO)) as a bridge for transmitting control signals between the control chip 108 and the touch device 112. In addition, the connection port 110 can be used to transmit data signals between the control chip 10 and the touch device 112. The touch device 112 can be, for example, integrated with a display as a touch panel. In addition, the memory unit 106 can be, for example, a random access memory (RAM) configured to store a basic input/output system (BIOS). More specifically, when the electronic device is powered on, the BIOS is loaded (not illustrated) into the memory unit 106 by a BIOS chip as for the processor to read and execute a booting process. Moreover, the BIOS can be, for example, a BIOS that is complied with an advanced configuration and power interface (ACPI) standard.

Referring to FIG. 1 and FIG. 2 together, in step S201, when the touch device 112 is idle for over an idle time, a firmware of the touch device 112 informs the BIOS through the interrupt pin of the control chip 108 to disable the connection port 110. In other words, within the idle time (e.g., three minutes), if a user fails to performed an input operation by using an input device on the touch device 112 as for the touch device to generate a corresponding input signal or transmit any data (e.g., when the user uses other input devices instead of the touch device or when the user uses display function of the touch device for a long time without performing input operation directly to the touch device), the BIOS is informed through the interrupt pin of the control chip 108 to disable the connection port 110. The aforementioned idle time can be customized by the user, and the invention is not limited thereto.

Next in step S205, whether the processor 102 receives at least one touch signal from the touch device 112 through the interrupt pin 108a of the control chip 108 within a first predetermined time is determined. In other words, a foolproof test is performed after the connection port 110 is disabled and before a power state of the touch device 112 is switched to a power-saving mode, so as to ensure that the power state of the touch device 112 is not switched between a normal mode (D0) and power-saving modes (D1 to D3) without stopping due to a mistouched input by the user. For instance, after the connection port 110 is disabled and before the power state of the touch device 112 is switched to the power-saving mode, the electronic device 100 holds for a pending time (i.e., a first predetermined time such as 110 to 300 seconds). When a number of touch signal from the touch device 112 received by the processor 102 through the interrupt pin 108a of the control chip 108 is not less than a specific amount (i.e., a first predetermined amount such as three times) within the pending time (That is, a number of times for the touch device 112 being continuously touched by the user is not less than the specific amount), a touch operation constantly performed by the user is determined to be a valid input operation. Otherwise, the touch operation by the user is determined to be an invalid input operation (i.e., the mistouched input).

In step S211, the connection port 110 is enabled when the number of at least one touch signal from the touch device 112 received by the processor 102 through the interrupt pin 108a of the control chip 108 within a first predetermined time is not less than a first predetermined amount. On the other hand, in step S215, a reading operation for reading the connection port 110 is interrupted and the touch device 112 enters a power-saving mode when the number of the at least one touch signal from the touch device 112 received by the processor 102 through the interrupt pin 108a of the control chip 108 within the first predetermined time is less than the first predetermined amount or none of the at least one touch signal is received within the first predetermined time.

Figure 3:
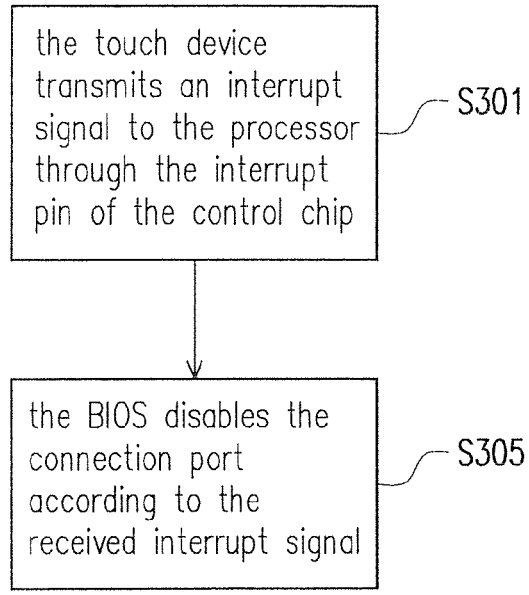
FIG. 3 is a process flowchart illustrating a process to disable a connection port according to an embodiment of the invention.

FIG. 3 is a process flowchart illustrating a process to disable a connection port according to an embodiment of the invention. Referring to FIG. 3, another method for the firmware of the touch device 112 in the step S201 to inform the BIOS through the interrupt pin of the control chip 108 as to disable the connection port 110 further includes: the firmware of the touch device 112 transmits an interrupt signal to the processor 102 through the interrupt pin 108a, as shown in step S301. Next in step S305, the processor 102 executes the BIOS to disable the connection port 110 according to the received interrupt signal. That is, in an operating system executed by the processor 102, the connection port 110 may be disabled by the BIOS which is triggered according to the interrupt signal.

Figure 4:
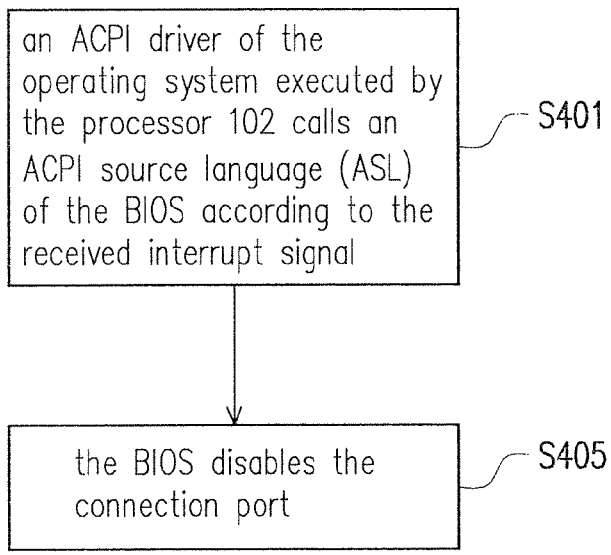
FIG. 4 is a process flowchart illustrating a process of a BIOS to disable a connection port according to an embodiment of the invention.

FIG. 4 is a process flowchart illustrating a process of a BIOS to disable a connection port according to an embodiment of the invention. Referring to FIG. 4, another method for the BIOS to disable the connection port 110 as in step S305 of above embodiment further includes: in step S401, an ACPI driver of the operating system executed by the processor 102 calls an ACPI source language (ASL) of the BIOS according to the received interrupt signal. Accordingly, the BIOS disables the connection port 110 (step S405).

Figure 5:
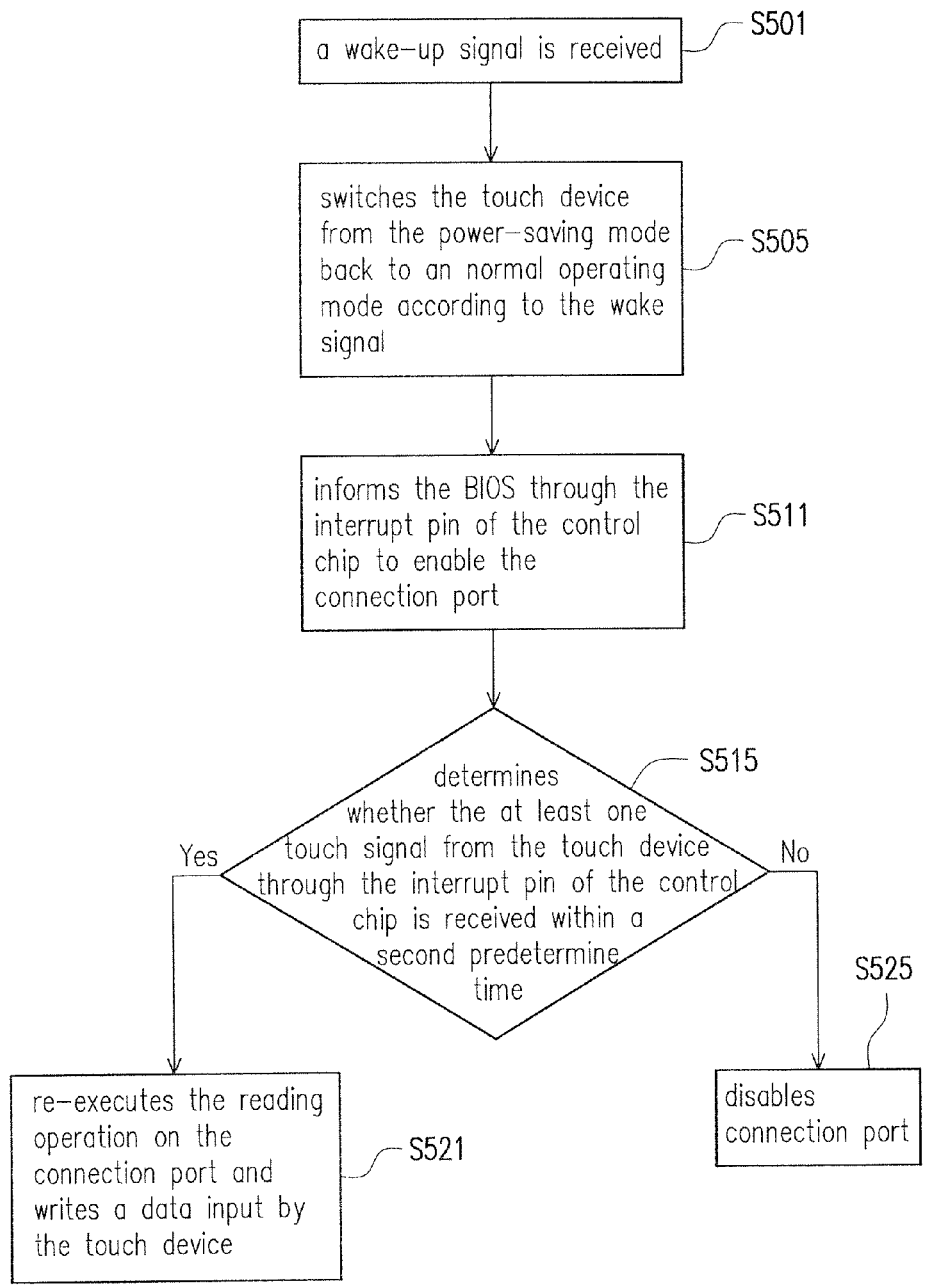
FIG. 5 is a process flowchart illustrating a power-saving operating method according to an embodiment of the invention.

FIG. 5 is a process flowchart illustrating a power-saving operating method according to an embodiment of the invention. A method for resuming the touch device as illustrated in FIG. 5 is further provided after the power-saving operating method in above embodiments with reference to FIG. 2 is performed. Referring to FIG. 5, in a step S501, a wake-up signal is received. Next in step S505, the touch device 112 is switched from the power-saving mode back to an normal operating mode according to the wake-up signal. In step S511, the firmware of the touch device 112 informs the BIOS through the interrupt pin 108a of the control chip 108 to enable the connection port 110. In other words, the touch device 112 can transmit a resuming signal to the processor 102 through the interrupt pin 108a of the control chip 108. Next, the operating system executed by the processor 102 may trigger the BIOS according to the resuming signal, so as to enable the connection port 110.

Next in step S515, whether the processor 102 receives the at least one touch signal from the touch device 112 through the interrupt pin 108a of the control chip 108 within a second predetermined time is determined. That is, another foolproof test is performed to ensure that the connection port 110 is enabled when the valid input operation is performed to the touch device 112, so that the processor 102 may perform the reading operation on the connection port 110 and writes data input by the touch device. For instance, after the connection port 110 is enabled and read, the electronic device 100 holds for a pending time (i.e., a second predetermined time such as 110 to 300 seconds). When a number of touch signal from the touch device 112 received by the processor 102 is not less than a specific amount (i.e., a second predetermined amount such as three times) within the pending time (meaning that a number of times for the touch device 112 being continuously touched by the user is not less than the specific number of times), such a touch operation constantly performed by the user is determined to be a valid input operation. Otherwise, the touch operation by the user is determined to be an invalid input operation (i.e., the mistouched input).

In step S521, the processor 102 re-executes the reading operation on the connection port 110 and writes a data input by the touch device 112 when the number of the at least one touch signal from the touch device 112 received within the second predetermined time is not less than the second predetermined amount. Otherwise, in step S525, the processor 102 disables the connection port when the number of the at least one touch signal from the touch device 112 received within the second predetermined time is less than a second predetermined amount or none of the at least one touch signal is received within the second predetermined time.

Altogether, in the invention, the interrupt pin on the control chip is used as a bridge (medium) for transmitting control signals between the electronic device and the touch device. When the touch device is idle, the interrupt signal is transmitted to the processor through the interrupt pin, and with the operating system executed by the processor under the ACPI standard, the BIOS is triggered to disable the connection port between the touch device and the electronic device, so as to switch the power state of the touch device from the normal operating mode to the power-saving mode. Therefore, the power consumption of the touch device is reduced.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A power-saving operating method for an electronic device having a processor, a control chip and a connection port, wherein the control chip further comprises an interrupt pin, the electronic device couples to a touch device through the connection port and the interrupt pin, and the control chip couples to the connection port, the method comprises:

informing a basic input/output system through the interrupt pin of the control chip by the touch device to disable the connection port when the touch device is idle for over an idle time;

determining whether the processor receives at least a touch signal from the touch device within a first predetermined time;

enabling the connection port when a number of the at least touch signal from the touch device received by the processor through the interrupt pin within the first predetermined time is not less than a first predetermined amount; and interrupting a reading operation for reading the connection port and making the touch device enter a power-saving mode when the number of the at least touch signal from the touch device received by the processor through the interrupt pin within the first predetermined time is less than the first predetermined amount or none of the at least signal is received within the first predetermined time.

2. The power-saving operating method of claim 1, wherein the step of informing a basic input/output system through the interrupt pin of the control chip by the touch device to disable the connection port when the touch device is idle for over an idle time, further comprises:

transmitting an interrupt signal from the touch device to the processor through the interrupt pin of the control chip; and disabling the connection port by the basic input/output system according to the interrupt signal received by the processor.

3. The power-saving operating method of claim 2, wherein the processor executes an operating system, and the step of disabling the connection port by the basic input/output system comprises:

calling an advanced configuration and power interface source language of the basic input/output system by an advanced configuration and power interface driver of the operating system according to the interrupt signal received by the processor to make the basic input/output system disable the connection port.

4. The power-saving operating method of claim 1, after the step of making the touch device enter the power-saving mode, further comprising:

receiving a wake-up signal;

switching the touch device from the power-saving mode back to an normal operating mode according to the wake-up signal;

informing the basic input/output system through the interrupt pin of the control chip by the touch device to enable the connection port;

determining whether the processor receives the at least touch signal from the touch device within a second predetermined time;

disabling the connection port by the processor when the number of the at least touch signal from the touch device received by the processor within the second predetermined time is less than a second predetermined amount or none of the at least one touch signal is received within the second predetermined time; and re-executing the reading operation on the connection port by the processor and writing a data input by the touch device by the processor when the number of the at least touch signal from the touch device received by the processor within the second predetermined time is not less than the second predetermined amount.

5. The power-saving operating method of claim 1, wherein the control chip comprises a platform controller hub.

6. The power-saving operating method of claim 1, wherein the interrupt pin comprises a general purpose input/output.

7. An electronic device, comprising:

a connection port coupled to a touch device;

a control chip having an interrupt pin, wherein the electronic device couples to the touch device through the connection port and the interrupt pin, and the control chip couples to the connection port;

a memory unit storing a basic input/out system;

a processor, wherein the touch device transmits an interrupt signal to the processor through the interrupt pin of the control chip when the touch device is idle for over an idle time, and the processor is:

executing the basic input/output system to disable the connection port according to the received interrupt signal;

determining whether at least a touch signal from the touch device is received within a first predetermined time;

executing the basic input/output system to enable the connection port when a number of the at least touch signal from the touch device received through the interrupt pin within the first predetermined is not less than a first predetermined amount; and interrupting a reading operation for reading the connection port and making the touch device enter a power-saving mode when the number of at least touch signal from the touch device received through the interrupt pin within the first predetermined time is less than the first predetermined amount or none of the at least signal is received within the first predetermined time.

8. The electronic device of claim 7, wherein the processor executing the basic input/output system to disable the connection port, further comprises:

calling an advanced configuration and power interface source language of the basic input/output system by an advanced configuration and power interface driver of an operating system executed by the processor according to the interrupt signal received by the processor to make the basic input/output system disable the connection port.

9. The electronic device of claim 7, after making the touch device enter the power-saving mode, further:

switching the touch device from the power-saving mode back to an normal operating mode according to a wake-up signal;

transmitting a resuming signal from the touch device to the processor through the interrupt pin of the control chip; and executing the basic input/output system by the processor to enable the connection port according to the resuming signal received by the processor, determining whether the at least touch signal from the touch device is received within the second predetermined time by the processor, disabling the connection port by the processor when a number of the at least touch signal received from the touch device within the second predetermined time is less than a second predetermined amount or none of the at least one touch signal is received within the second predetermined time, and re-executing the reading operation on the connection port and writing a data input by the touch device by the processor when the number of the at least one touch signal received from the touch device within the second predetermined time is not less than the second predetermined amount.

10. The electronic device of claim 7, wherein the control chip comprises a platform controller hub.

11. The electronic device of claim 7, wherein the interrupt pin comprises a general purpose input/output.

* * * * *